April 2, 1929.    W. F. ZIMMERMANN    1,707,546
GEAR HOBBER CONTROL
Filed Dec. 24, 1926    5 Sheets-Sheet 4
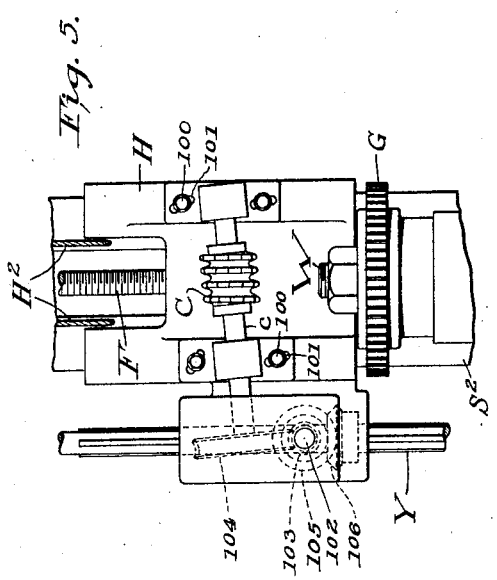
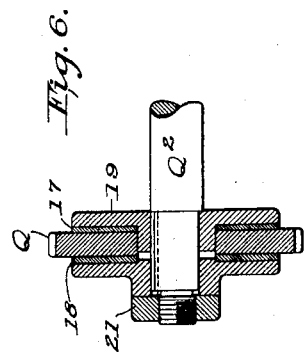
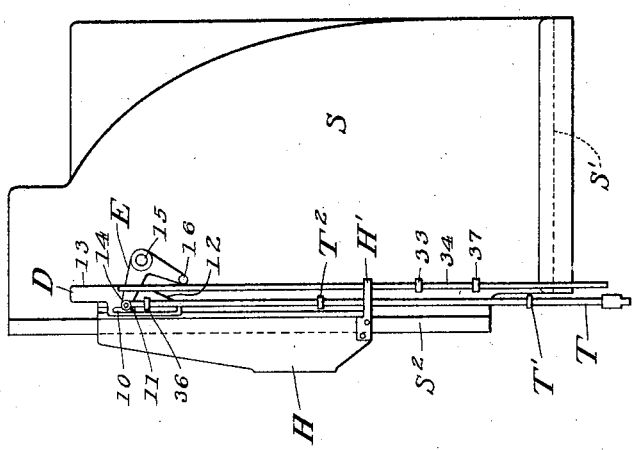
Inventor
William F. Zimmermann
By Attorney
Albert F. Nathan

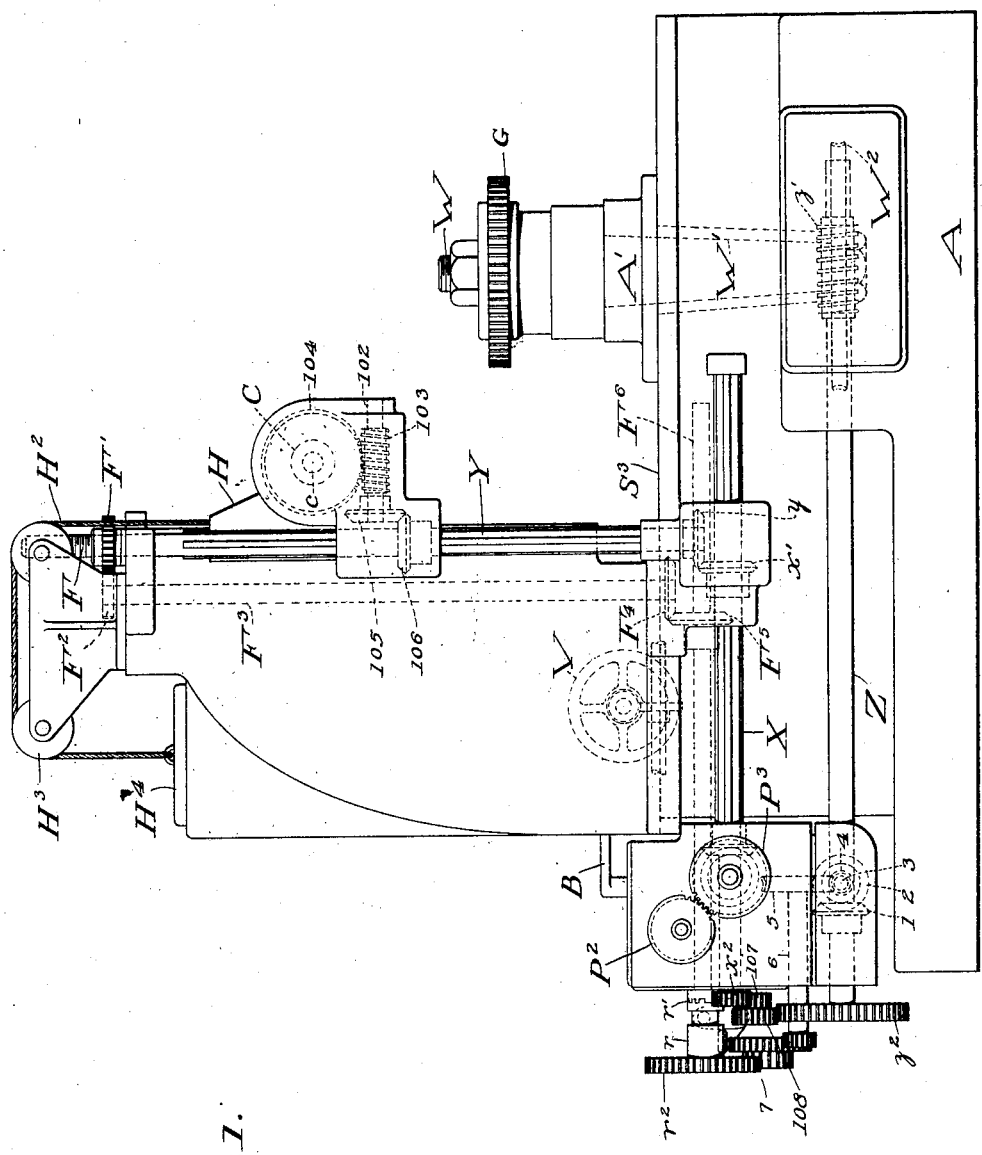

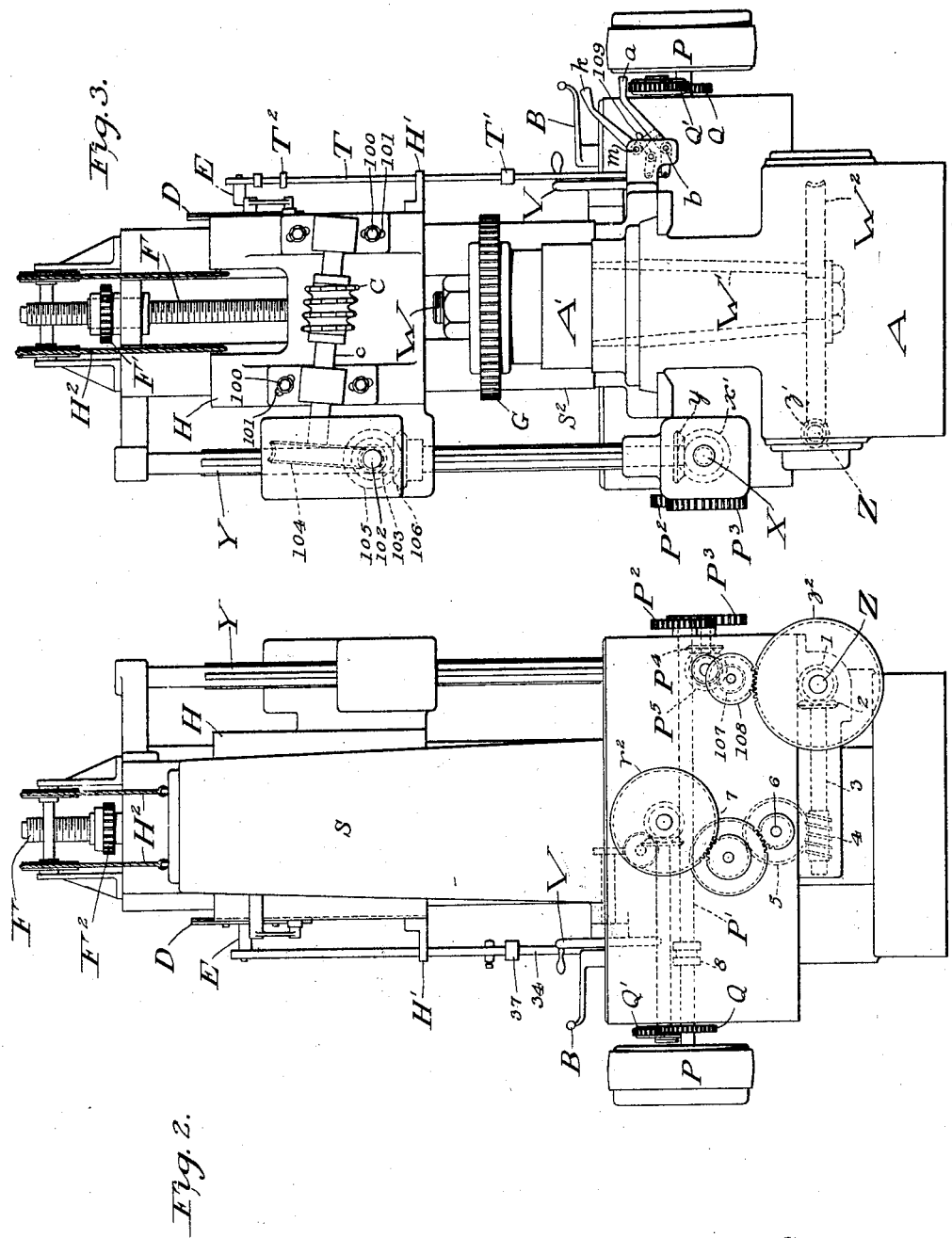

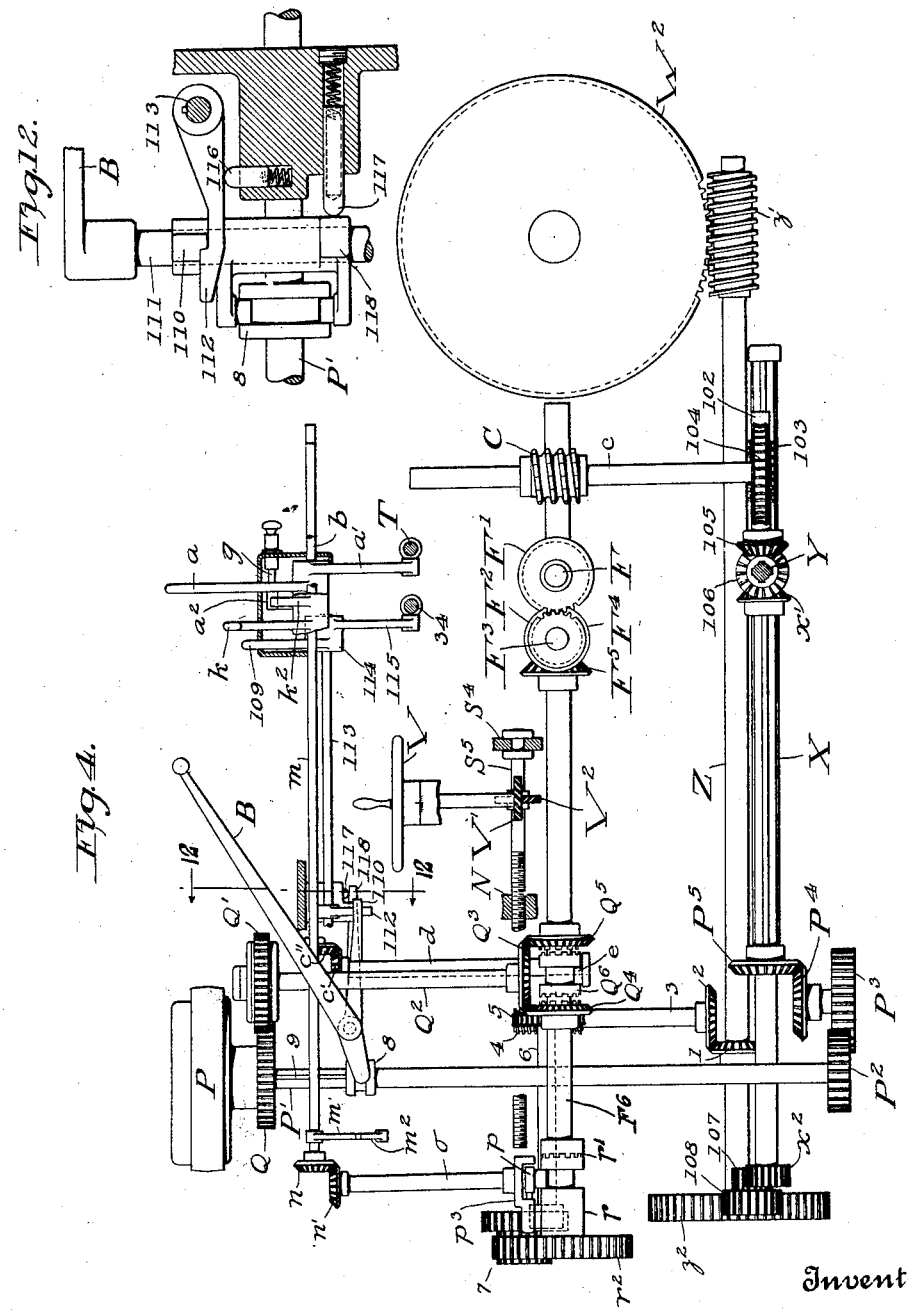

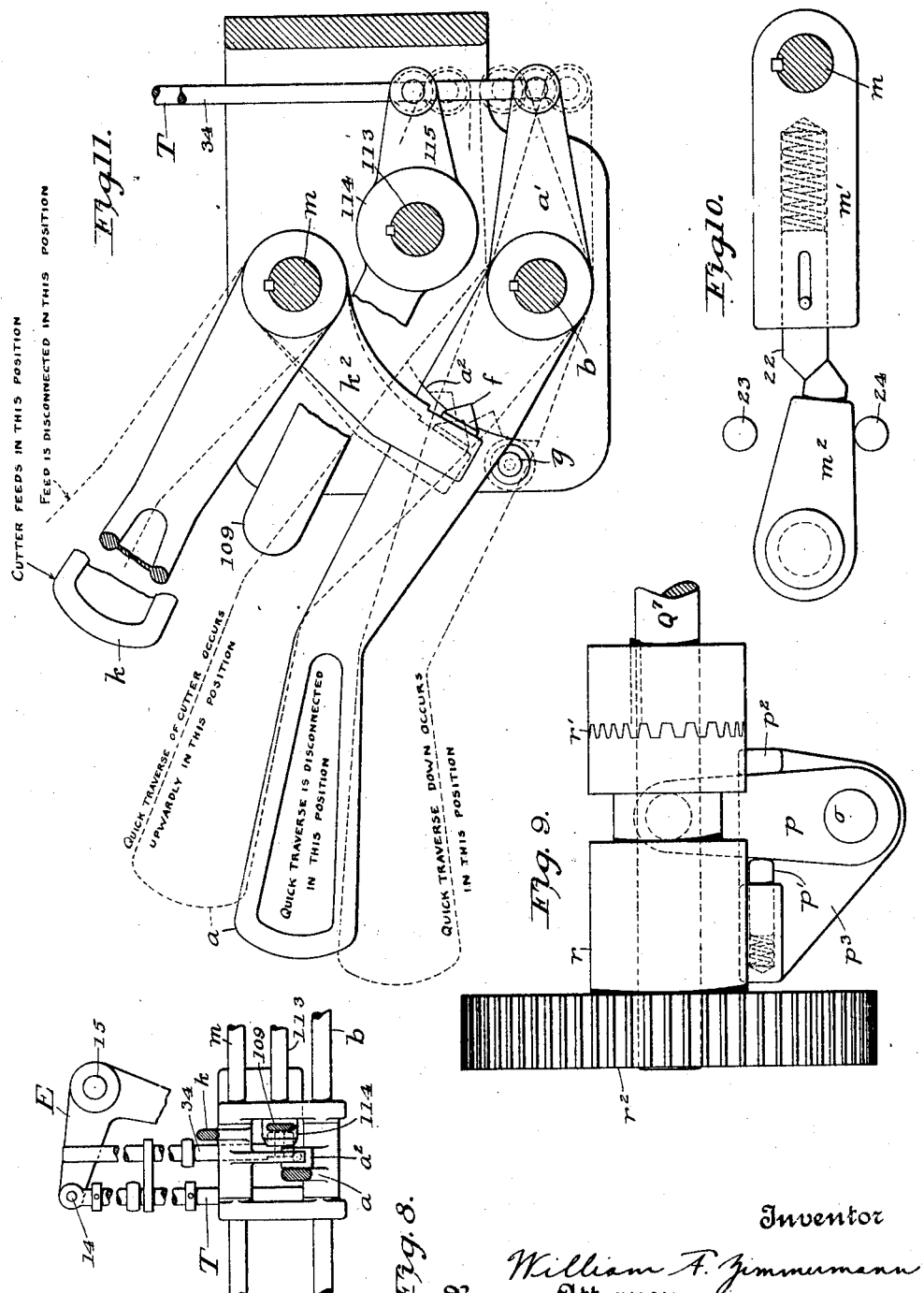

Patented Apr. 2, 1929.

1,707,546

UNITED STATES PATENT OFFICE.

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY.

GEAR-HOBBER CONTROL.

Application filed December 24, 1926. Serial No. 156,816.

This invention relates to a control system for hobbing-machines; its aim being to increase the productivity of such machines by providing a triple-function feed-stop; to wit, which automatically stops the feed, which automatically suspends visible motion of other parts and thus announces the conclusion of the work, and which automatically conditions the machine for immediate unloading and reloading.

In my earlier application No. 734,487, filed August 27, 1924, there was disclosed a control system then thought to reduce the necessary manipulations of the user to an irreducible minimum. That earlier system appeared to answer all requirements of a spur-gear hobber but it was not practical for a helical-gear hobber, and a study of that special problem ultimately led to the mechanical solution proposed in my subsequent application No. 4,207, filed January 23, 1925, which consequently, was addressed specifically to machines for cutting helical gears. That later application was predicated upon a unique combination of a helical hobber with a control peculiarly compatible therewith and intimately related thereto; the resultant effect of the combination affording automatic, as well as manual, manipulation of the running of the machine without disturbing the relationships between the several variables for producing the helical effect.

I subsequently discovered that that solution, although originally supposed to be of significant utility only in connection with helical gear-hobbers (where correlation of all rotations must be preserved) could be applied with marked advantage to spur-gear hobbers not involving the need for correlation preservation in the sense of helical-gear hobbers. It thereby was perceived that that solution had a scope broader than originally was apparent and had a greater range of utility than seemed initially possible for the reason that it was devised with the particular object of meeting a condition peculiar to helical-gear hobbers and not exhibited by spur-gear hobbers. In other words, apart from that helix-generating combination, its special control means may enter into combination advantageously with organizations of the spur-hobbing type. In spur-hobbers the feed alone may be arrested, providing the relation between the rotations of the work and cutter spindles be maintained without alterations, but, from the standpoint of the user, it is desirable among other capacities of the control system, and as will be explained, to make simple provision for a quickly available simultaneous arrest of the feed as well as the rotation of the spindles.

This application will, accordingly, be devoted to showing how an improved control system for spur-gear hobbers (as for example such as in my earlier application No. 734,487, filed August 27, 1924) may be improved still more notably by resorting to the principles of construction devised specifically for helical-gear hobber.

In that earlier system, the feed is automatically arrested when the tool emerges through the work. Damage to the machine was thus prevented without depending upon the vigilance of the user. Soner or later, the user would notice that the tool had ceased to feed. He would then stop the machine, by manipulating an appropriate lever, and unload and reload the machine, and start it on its next batch of blanks.

Now the feed is a slow movement and not particularly noticeable, especially if the attentions of the user are required to be distributed among two or more machines. So the feed may automatically have been stopped for some time and yet to the eye of a user standing a few yards away the machine will appear to be in normal operation for the cutter and other parts will be revolving, the coolant flowing, and its hum being heard. This means loss of time and, in the aggregate, a considerable lag in production; all of which has heretofore been regarded as unavoidable.

When the feed stoppage is noticed, the user goes to the machine for the purpose of removing the finished spur-gears and for substituting fresh blanks. A manipulation precedent to doing that is the throwing of the lever that stops the cutter, etc. This again takes a certain amount of time.

But the above indicated time-losses are eliminated by the combination herein described for the automatic stop applies not only to the feed but also to such other elements as need to be stopped to enable the user to accomplish a work replacement and, as the rotations of these other elements are very noticeable to the eye, and their cessation likewise, it suffices for a mere glance to notify even a distant attendant that the machine requires blank-replacement. Time leakage is reduced in that particular and time is also saved by sparing the user the otherwise extra manipulation of throwing a manual lever to stop the cutter, etc., preparatory to removing the work and inserting a fresh blank.

Fig. 1 is a side elevation of a spur-gear hobbing-machine showing a fixed work-spindle and a shiftable stanchion supporting a head slidable thereon which carries a hob-spindle mounted at a major angle of ninety degrees and adjustable plus and minus therefrom through the minor incidental angle of the cutter. Figs. 2 and 3 are rear and front end-elevations of the machine. Fig. 4 is a skeleton of the transmission system and control levers for performing the various movements of the working and positioning elements of the machine. Fig. 5 is a modification of the hob-mount. Fig. 6 is a sectional detail of a friction coupling between the prime-mover and a part of the transmission system. Fig. 7 is a side elevation in detail of a portion of the interlocking control system for the quick traverse and feed for the hob-carrying head. Fig. 8 is a condensed fragmentary side-elevation of the means actuated by the cutter-slide for automatically operating the manually-operable levers for controlling the feed and the quick traverse. Fig. 9 is a detail of the spring snap clutch for throwing in and out the feed transmission. Fig. 10 is a detail of the spring-detent for urging the feed hand-lever into either one or the other of its alternative positions. Fig. 11 is an end-elevation of said levers. Fig. 12 is a sectional-elevation, through line 12—12 of Fig. 4 showing an interlock for enabling the user manually to swing the main control lever from its "stop" to its "start" position; and showing also spring-operated means combined with means for releasing said interlock to enable said spring-operated means to perform the operation of throwing said lever into its "stop" position.

The bed A, in this embodiment, is elongated and positioned horizontally and provides a forward working region in which the work-spindle is directly journaled so as to occupy a fixed position, and the bed provides also a rear mechanism supporting region on which the stanchion is slidably mounted. The work spindle W is shown journaled in fixed bearings A' and it extends downwardly into the interior of the bed as indicated by W' and, at its lower end carries a worm-wheel $W^2$ by which it is driven. The portion of the bed that houses the worm-wheel $W^2$ is appropriately enlarged to contain that wheel, and inasmuch as the wheel occupies a fixed position in space, the bed admits of being ribbed and reinforced closely to the wheel and thus made very rigid as will be understood without illustration. It is noteworthy that by thus giving the work spindle a fixed position at the forward end of the bed, it is at all times quickly accessible to the user and it is not at one time further from the end of the bed than at another as often happens when the work spindle is shiftable in position. The mounting of the spindle is accomplished in a very solid manner with the object of realizing the effect of an anvil so that it virtually supports the work substantially as solidly as though it was clamped to the bed itself, and in consequence, the tendency to vibrate and chatter is reduced to a minimum.

The stanchion S is in the nature of a heavy box-like casting which is provided with slideways S' and $S^2$ at right angles to one another; the slideways S' resting on the slideways $S^3$ provided by the surface of the bed and arranged to permit the heavy stanchion to be slid towards and away from the axis of the work spindle for the purpose of determining the diameter of the gear G to be cut by the machine. The purpose of the transverse slideways $S^2$ is to support and guide a head H which is thus shiftable in parallelism with the axis of the work-spindle so that the cutter or hob (which is carried by the head) may in the course of the feeding movement cut the teeth of the gear G. It will be understood that this head H is suitably gibbed to the slideways $S^2$ and, in order to counterbalance the weight of the head H, a counterweight $H^4$ may be arranged to rise and descend in an appropriate well provided by the stanchion S; conventional ropes and pulleys $H^2$ and $H^3$ being provided as will be understood.

It is to be noted that the stanchion, being heavy and massive, is in effect a part of the solid bed itself because when clamped down to that bed, it becomes very solid therewith owing to the action of the clamps augmented by the weight of the stanchion and by reason of the fact that the base of the stanchion S is very extensive so as to resist effectively such overturning forces as result from the pressure of the hob against the work during the tooling operation. It will likewise be noted that the stanchion requires to be shifted only when a change is to be made in the diameter of the gears being cut which ordinarily would be quite infrequent and it will also be noted that the shifting of the stanchion does not reduce the facility of access of the user to the work spindle and does not interpose obstructions when brought closer to that spindle. It will also be noted that the slideways S' at the base of the stanchion run to a region substantially underlying the head H so that this construction avoids the objectionable overhang which is necessitated whenever the work spindle is mounted on a carriage which slides on the bed.

The transmission system for rotating both the work spindle and the hob, and for progressively feeding the head H, and for shifting the position of the stanchion S, and for varying the rates of rotations and for shifting the parts quickly or slowly as the case may be, will now be described.

This transmission is in the nature of a balanced drive and comprehends an intermediate splined shaft X and two main transmission shafts Y and Z; shaft Y being also splined. These two shafts are disposed at right angles and the intermediate shaft is parallel with one of them; the latter being in this embodiment the shaft that communicates motion to the work spindle. The intermediate shaft receives the power in the first instance; this being accomplished by the power line consisting of a pulley or other prime mover, a friction clutch, the power shaft P' and appropriate gears such, for example, as the two spur gears $P^2$ and $P^3$ and the two angle gears $P^4$ and $P^5$. The splined transmission shaft Y is journaled in the shiftable stanchion so as bodily to travel therewith and at its lower end is provided with an angle gear $y$ which meshes with an angle gear $x'$ which is splined to the intermediate shaft X.

For spur-gear production, the machine is so made that the cutter C is mounted on a spindle $c$ which is journaled in the head at a fixed major angle of 90 degrees, but in order to provide for a slight plus and minus variation of that major angle, sloping either to the right as shown by Fig. 3 or to the left as shown by Fig. 4, the journals of the hob-spindle have a slight adjustment on the head H; as by means of bolts 100 and curved slots 101 struck about the axis 102 of a worm 103. The minor angle adjustment will be, plus and minus, in the neighborhood of five degrees for a single thread hob, and correspondingly greater for a multiple-thread hob.

The immediate drive comprises a worm-wheel 104, the worm 103 and a co-axial bevel 105, and a bevel 106 splined to the vertical transmission shaft Y; giving the adjustable right-angled 4-gear drive shown by the drawings.

The lower horizontal non-splined transmission shaft Z is journaled in the bed of the machine and has a worm $z'$ affixed thereto for driving the work-spindle W through the worm-wheel $W^2$. The two pairs of change gears $x^2$ and $z^2$, and 107 and 108, establish the driving relation between the intermediate power shaft X and the transmission shaft Z; it being observed that this arrangement provides a balanced drive in which the six gears $W^2$, $z'$, $z^2$, 108, 107 and $x^2$ transmit the motion to the work spindle, and likewise six gears 104, 103, 105, 106, $y$ and $x'$ transmit the motion to the cutter. Further details will be described in connection with an explanation of the manipulations of the machine.

The controls for the hobber, will now be explained. These provide for preliminary adjustments such as setting the hob at the required distance from the axis of the work to cut a gear of the desired diameter, and also for readily getting the hob close to the end of the blank so that it will not have to travel far, after the whole system is set and started in its fixed ratios of movements, before the hob comes into engagement with the blank and begins its cutting operation.

When the hob has run through the blank, and is entirely clear thereof, its travel must in due time be arrested; otherwise damage to the machine would result. The machine, at that particular time, may not be under the close observation of the user and, to safeguard it against accident, there is provided an automatic stop for discontinuing further travel of the cutter-head.

After the hob has completed its work, and after the finished gear has been removed from the work-spindle, it is desirable to return the hob to its starting point without undue loss of time, and a quick return control is provided for this purpose. The user may then insert a fresh blank and set the mechanism again in operation to repeat the cycle.

To manually shift the stanchion a hand-wheel V (provided with graduations or micrometer adjustments) is affixed to a shaft that carries an angle gear V' which meshes with an angle gear $V^2$ which in turn is splined to the screw $S^5$ which runs through the fixed nut N and causes the screw to translate bodily; this translation being communicated to the stanchion by means of an appropriate lug or part $S^4$ journaled to the screw. This manual means enables the user very readily to bring the stanchion to any desired position with respect to the work-spindle for cutting gears of predetermined diameters.

To start the machine the power lever B is actuated. This shifts the collar 8 and slides a long key 9 (which is translatably countersunk in the shaft P') and this key actuates a friction clutch (not shown) between the prime mover P and the shaft P'. The transmission elements previously described are then maintained in motion by the power, and the cutter and the work are both revolved and fed at the co-relative rates determined by the two change gears $z^2$, 108, 107 and $x^2$. A characteristic of the arrangement of this lever is that it is unidirectional in manipulation, i. e., it may be moved by hand to start the machine but, when so moved, it is held by a catch against being manually shifted back again, so that, to stop the machine, the starting lever must be released from the hook by means to be later referred to.

So much of the transmission system as constitutes the balanced drive for the two spindles has been described. The motion for feeding the hob is conveyed by a transmisson consisting of an angle gear 1 mounted on the shaft Z and meshing with an angle gear 2 affixed to the shaft 3. A worm 4 on that shaft drives a worm-wheel 5 which turns the shaft 6 and (through appropriate change-gears designated generally by 7) the gear $r^2$ is driven and this gear is affixed to a sleeve $r$ which is loosely mounted on the shaft $F^6$ which conveys the motion for feeding the cutter-head. The clutch teeth $r'$ are maintained in engagement so long as the hob is in the blank, but they may be disconnected to permit the shaft $F^6$ to be driven by other means when the hob is to be shifted down into proximity with the blank or shifted up past the removed blank into its initial position to start on the next cycle, as will be explained later.

Angle gears $F^5$ and $F^4$ transmit the motion of the shaft $F^6$ to the shaft $F^3$ which is journaled in the stanchion and, at its upper end, has a gear $F^2$ which meshes with a gear $F'$ which is a unit with a nut that turns about the non-rotatable feed-screw F. That feed-screw is affixed to the head H and is caused to move up or down, as the case may be, by the rotating nut. In this manner, the hob journaled on the head H is caused to feed downwardly whenever the hob is in the blank and the parts are connected as described, or caused to make a quick traverse either up or down when the hob is clear of the blank and the parts are differently connected, as will be described.

To stop the entire machine, either manually or through an automatic trip, the hook 112 must be depressed. To do this manually, the lever 109 must be operated; said lever 109 serving to release the catch and enable the lever B to return and the master-clutch to open through a quick-acting spring action. Referring to Fig. 12, there will be seen an arm 110 extending from the pivot-shaft 111 of starting-lever B. The extremity of said arm 110 over-rides a depressible hook 112 (see also Fig. 4) which is keyed to a rock-shaft 113 extending along-side the machine and splined to a bell-crank lever 114; the one arm 109 of which is operable manually, and the other arm 115 of which is operated automatically by certain trip mechanism;— in each case to stop the entire machine. A spring-pressed plunger 116 normally holds up the hook 112 but permits its depression as described. When thus depressed, the catch is released and the arm becomes free to swing and the starting lever B can now move into its "stop" position; this being done by the pressure of a spring-pressed plunger 117 which acts against another arm 118 also extending from the pivot-shaft 111, with the result that the collar 8 is shifted on the main power shaft P' to open the master-clutch.

The transmission which is utilized to drive the shaft $F^6$ at a quick-traverse rate (in lieu of the slow-driving gear $r^2$) when it is desired to accomplish a preparatory shift of the hob-carrying head, is as follows: Fast to the pulley P is a gear Q which permanently meshes with a gear Q' which is frictionally connected through the leather facings 17 and 18 (see Fig. 6) of the clamp disks 19 and 20 with the shaft $Q^2$; a nut 21 serving to determine the amount of the friction. In this manner, the shaft $Q^2$ is driven simultaneously with, but impositively by, the pulley P so that slippage may occur and breakage prevented in case the head be brought against some obstacle. On the end of the shaft $Q^2$ is a bevel gear $Q^3$ which permanently meshes with right and left bevel gears $Q^4$ and $Q^5$ which are loosely mounted on the shaft $F^6$.

A clutch $Q^6$ is splined to the shaft $F^6$, and when shifted to the one side or the other, will cause that shaft to be rotated either one way or the other; or not at all if the clutch $Q^6$ be in neutral position. The position of the clutch is determined by a finger $e$ projecting from a lever on the rock-shaft $d$ which, through the bevel gears $c'$ and $c''$, is actuated by the rock-shaft $b$ which in turn is rocked by the hand-lever $a$.

To shift quickly down the cutter head, the lever $a$ must be moved down into the lower dotted position shown by Fig. 11. Before this can be done, the block pin $g$ must be pulled against its spring out of the path of that lever. This temporary obstruction is precautionary so that the user will be obliged deliberately to perform an extra operation to bring the head down rapidly; otherwise he might inadvertently press down the lever $a$ and cause the cutter to be brought down too rapidly into the work and broken. An interlock is shown by Fig. 11 in which the rock-shaft $m$ that controls the connection (by shifting the gear $r^2$) of the slow motion transmission, has an arm $k^2$ provided with a V-shaped finger $f$ which (when the feed is "on") enters a central recess in the ledge $a^2$ of the lever $a$. When, however, the lever $a$ is not in its neutral position, the finger $f$ will, by reason of its double slope, be forced out of the recess and caused to ride on the higher portions of the ledge $a^2$ and this can only happen when the feed-lever $k$ is in the dotted position indicated by Fig. 11.

The means whereby the rock-shaft $m$ determines the engagement and dis-engagement of the clutch teeth $r'$ is shown best by Figs. 4 and 9. A shifter arm $p$ acts to bodily shift the sleeve $r$ to establish or disconnect the parts described; this shifter arm being loosely mounted on the shaft $o$. A yieldable detent $p'$ acts on the shifter pin so as to urge the parts into clutching relation; the purpose being to provide a quick yet not too positive an action. Bevel gears $n$ and $n'$ connect the shaft $o$ with a rock-shaft $m$ and a hand-lever $k$ permits the rock-shaft $m$ to be moved manually. On this rock-shaft $m$ is a small arm $m'$ which has a spring-pressed pawl 22 cooperating with an oscillatable pawl $m^2$. The latter, by moving against either the stop-pin 23 or the stop-pin 24, will resiliently determine the position of the rock-shaft $m$ and this motion will be correspondingly imparted to the rock-shaft $o$, which carries the part $p^3$ provided with the aforesaid yielding detent $p'$ to throw the sleeve clutch $r$ impositively into operative position and provided also with the lug $p^2$ to throw it positively out. Thus it will be seen that, when clutch $Q^6$ is in either its right or its left engaging position, clutch $r'$ is disconnected, and when clutch $r'$ is engaged, clutch $Q^6$ can be only in its neutral non-transmitting position. Therefore, by pulling out pin $g$ and by depressing the lever $a$, the feed is disconnected and the quick traverse is accomplished and the head H moves down rapidly.

To shift quickly and upwardly the cutter head, the lever $a$ is raised to the upper dotted position shown by Fig. 11. The interlock again insures that the feed will be out so that when the clutch $Q^6$ is moved into its motion reversing position, the transmission will take place through the quick traverse means and the head will go up rapidly.

To adjust the limits of the "quick traverse" travel of the cutter head, this invention provides a shift-rod T pivoted to the free end of an arm $a'$ extending to the right (as shown by Fig. 11) from the pivot of the hand-lever $a$ so that, when lever $a$ is despressed, the shift-rod T will rise, and conversely. Hence if said rod T be pushed down, the effect will be the same on the control mechanism as if the user had pulled up the handlever $a$.

Now, adjustably bolted (by slot 10 and bolts 11) to the cutter-head H is a cam-plate D. This has an inclined face 12 and within the path of travel of that face will be (when the quick down traverse is on) the finger 16 on the end of the lower arm of a bell-crank lever E which has a fixed pivot at 15. The shift-rod T is pivoted at its upper end 14 to the other arm of that bell-crank lever. Hence, when the shift-rod is raised (to produce a quick down-traverse) the finger 16 will be in the path of the cam-plate D. If now the cutter-head descends, the inclined face will in due time contact with the finger 16 and depress the shift rod T; thus raising the hand-lever $a$.

But this automatic raising of the hand-lever $a$ (corresponding to a depression of the shift rod T) will cease as soon as the inclined face 12 has passed the finger on the bell-crank lever E. It is to be noted that the extent of this movement is such that, when the finger is coincident with the flat non-sloping face 13 of the cam-plate D, the hand-lever $a$ is in its mid-position as shown in full lines by Fig. 11. Hence the detent $f$ of the feed hand-lever $k$ will now be able (when actuated by the user) to enter the notch in the surface $a^2$ and the down-feed of the cutter-head will be substituted for the down quick-traverse. The cutter is now about to enter the work at a "feed" rate only and cut the gear-teeth. If now the user should try, through a mistake, to push down the hand-lever $a$, he would be prevented by the finger 16 which is now riding along the non-sloping face 13. Therefore, the down quick-traverse is limited (by adjusting the initial position of the cam plate D) and the user cannot commit the error of causing the cutter to enter the work at any rate faster than that of the normal "feed".

To adjust the limit of the upward quick-traverse, the collar or dog $T^2$ is set at the appropriate point on the rod T so that the projection $H'$ (affixed to the cutter-head) will engage said collar and move the traverse rod T upwardly and thereby depress the hand-lever $a$ from its raised into its neutral position. This will stop the travel of the cutter-head H because the detent shown by Fig. 10 will hold the hand-lever $k$ in the dotted line position shown by Fig. 11 until it is actuated by hand.

To limit the extent of feed, there is an adjustable collar 33 on the feed shift-rod 34 which controls the position of the hand-lever 109 as will be understood. Also, as a matter of precaution, collars $T'$, 36 and 37 are permanently affixed to the respective rods T and 34 to prevent the user from making any adjustments beyond the maximum scope of travel provided for the cutter head H.

The shift-rod 34, being pivoted to the arm 115, will turn the shaft 113 counter-clockwise, as viewed by Fig. 12, whenever the projection $H'$ on the descending head H meets and pushes down the collar 33. This will release the catch 112 and permit the spring-plunger 117 to snap open the master clutch in the main pulley P and thus stop the entire machine; excepting of course the auxiliary quick-traverse line from Q to the reverse gears $Q^4$ and $Q^5$ which idle with the prime-mover P. The user will, of course, so adjust the collar 33 on the shift-rod 34 that the hob will have fed automatically entirely clear of the blank before the drive-system is automatically stopped as described.

The attendant, upon the conclusion of the cut, will remove the blank from the stopped work-spindle. Upon lifting the lever $a$ and clutching the then-idling gear $Q^5$ to the then-still shaft $F^6$, the cutter-head will rise quickly to its initial position until arrested by the push of the projection $H'$ against the collar $T^2$. The attendant can then mount a fresh blank on the then-still work-spindle. Upon depressing the handle $a$, the hob will be moved quickly towards and stopped (by the cam D) near the upper end of the blank. The lever B is then operated to close the master-clutch and the handle $k$ is then actuated to engage the clutch teeth r', and the hob thereupon proceeds to enter the blank and cut the spur-gear.

Without further analysis, the foregoing will so fully reveal the gist of this invention that others can, by applying current knowledge, readily adapt it for various utilizations by retaining one or more of the features that from the standpoint of the prior art, fairly constitute essential characteristics of either the generic or specific aspects of this invention, and therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A hobber combining a hob-spindle; a slidable head therefor; a work-spindle; a prime-mover; a frictional master-clutch; a drive-system deriving motion from said friction clutch and comprising a transmission extending from the one spindle to the other for establishing the rotational ratio therebetween; a branch transmission for sliding said head; positive means deriving motion from said drive system for slowly driving said branch transmission to feed said head; an impositive means deriving motion from said prime-mover and interchangeably available for more rapidly driving said branch transmission to cause a quick-traverse of said head; a control system for automatically rendering said impositive means impotent to traverse said head in the portion of its path utilized during the actual hobbing action; and an interlock for prohibiting the utilization of said positive means while said impositive means is potent.

2. A hobber combining a hob-spindle; a slidable head therefor; a work-spindle; a drive-system comprising a transmission extending from the one spindle to the other for establishing the rotational ratio therebetween; a branch transmission for sliding said head; a first means for positively and slowly driving said branch transmission; a second means interchangeably available for more rapidly driving said branch transmission to cause a quick-traverse of said head; an interlock control system for automatically rendering said first means impotent to feed said head when said second means is set in action, and for permitting said first means to be utilized when said second is out, and an independent trip mechanism for automatically disconnecting said drive system from the source of motion when said head has carried the hob through the blank.

3. A hobber combining a work-spindle; a hob-spindle; a slidable head for one of said spindles; transmission elements for rotating said spindle and feeding said head; a prime-mover; a clutch of the impositive type; a hand-lever adapted to render said clutch effective to drive said transmission elements; a latch for preventing said hand-lever from being manually actuated to discontinue said drive; a second hand-lever; and mechanism for enabling it to release said latch and render said clutch ineffective.

4. A hobber combining a work-spindle; a hob-spindle; a slidable head for one of said spindles; transmission elements for rotating said spindle and feeding said head; a prime-mover; a friction clutch; resilient means urging said clutch open; a lever adapted to be operated manually to overcome said resilient means to render said friction clutch effective to drive said transmission elements; latch means for preventing said hand-lever from swinging reversely to discontinue said drive; a second hand-lever; and mechanism for enabling it to render said latch-means ineffective and thereby permit said resilient-means to open said friction clutch.

5. A hobber combining a work-spindle; a hob-spindle; a slidable head for one of said spindles; transmission elements for feeding said head and rotating said spindles; a prime-mover for simultaneously driving said elements; a friction clutch; resilient means urging said clutch open; a latch-device for holding said means in a position such that said friction clutch is closed; and a trip mechanism operated by said slidable head for releasing said latch-device to permit said resilient means to open said friction clutch.

6. A hobber combining a hob-spindle; a slidable head therefor; a work-spindle; a transmission extending from the one spindle to the other for establishing the rotational ratio therebetween; a prime-mover; a clutch; a branch transmission for sliding said head; a first means deriving motion through said clutch for positively driving said branch transmission and simultaneously said spindle-driving transmission; a second means interchangeably available for more rapidly driving said branch transmission to cause a quick-traverse of said head; an interlock control system for automatically rendering said first means impotent to feed said head when said second means is set in action, and for permitting said first means to be utilized when said second is out; a first trip mechanism for rendering said second means ineffective before said branch transmission has carried said head into the hobbing region; and an independent trip mechanism for automatically disconnecting said clutch when said head has carried the hob through the blank.

7. A hobber combining a hob-spindle; a slidable head therefor; a work-spindle; a drive-system comprising a transmission extending from the one spindle to the other for establishing the rotational ratio therebetween; a prime-mover; a first clutch for connecting it with said drive-system; a branch transmission for sliding said head; a second clutch for positively relating said branch transmission to said drive-system; a reversing clutch; means continuously driven by said prime-mover adapted to be connected through said third clutch with said branch transmission to cause a quick-traverse of said head; a trip mechanism operated by said slidable head for so controlling said reversing clutch that it can cause the head to descend only when the hob is out of contact with the blank, said trip mechanism being adapted to open said first clutch at the conclusion of the hobbing operation; and an interlock for opening said second clutch whenever said reversing clutch is closed.

8. A spur gear hobber combining a rotatable hob-spindle; a rotatable work-spindle; a feedable head for one of said spindles; a general transmission positively actuating said parts simultaneously at tooling rates; a prime-mover; a master friction-clutch; means operable either automatically by said head or manually for opening said friction-clutch; and a hand-lever for closing said friction-clutch to cause said prime-mover impositively to drive said general transmission.

9. A spur-gear hobber combining a rotatable hob-spindle; a rotatable work-spindle; a feedable head for one of said spindles; a general transmission positively actuating said parts simultaneously; a prime-mover; a master friction-clutch; two hand-levers, the first for closing and the second for opening said friction-clutch; and a connection for enabling said feedable head at a predetermined station to operate said second lever automatically.

10. A spur-gear hobber combining a hob-spindle; a work-spindle; a normally idling but continuously-driven transmission terminating in a reversing mechanism; a general transmission for relatively rotating and feeding the spindles; a positive-clutch in said general transmission for discontinuing the feeding action thereof; a prime-mover; a friction-clutch; a hand-lever for closing said friction clutch to connect said prime-mover with said general transmission; another lever operable manually and automatically to disconnect said friction-clutch; and a third-lever adapted first to open said positive-clutch and then to render said reversing-mechanism operable to transmit motion from said continuously-driven mechanism in either direction.

11. A spur-gear hobber combining a pair of spindles; a feedable-head for one of said spindles; a transmission extending continuously from the one to the other for permanently maintaining the rotational ratio predetermined by a preliminary setting; and having a branch-transmission leading to said head; a positive-clutch for isolating said branch-transmission from said first transmission; a fast-running transmission; a motion-reverser for disconnecting or connecting the latter with the branch-line transmission; a lever shiftable to occupy either one of three positions to control said motion-reverse; a second lever for controlling said positive-clutch; a master friction-clutch; a third lever for closing said master friction-clutch; a fourth lever for opening said friction-clutch; and mechanism adapted to be actuated by said feedable head for operating said fourth lever automatically.

12. A spur-gear hobber combining a continuously running prime-mover; a main transmission system; a master-clutch therebetween; work and hob spindles adapted to be simultaneously rotated and translated by said system; an auxiliary transmission continuously driven by said prime-mover independently of said master-clutch; an automatic throw-out for said master-clutch; and control means enabling said auxiliary transmission to accomplish a rapid relative translation between said spindles when said main transmission system is ineffective to effect its translation between said spindles.

13. A spur-gear hobber combining two spindles rotatable and translatable relatively; means connectible therewith for accomplishing said translation rapidly; a lever adapted when moved in a given direction so to connect said means as to enable it to translate one of said spindles rapidly in said direction; a trip for automatically disengaging said means at a predetermined station in the advance of said translation; a frictional master-clutch, means connectible therewith for slowly continuing said translation; manual means for reversing the direction of said translation; and an interlock for substituting said first-mentioned for said second-mentioned means when said reversing means has been resorted to.

14. A hobber combining a hob-spindle; a slidable head therefor; a work-spindle; a drive-system comprising a transmission extending from the one spindle to the other for establishing the rotational ratio therebetween; and including a branch transmission for sliding said head; a prime-mover; a master clutch for connecting it with said drive-system; an automatic throw-out for said master-clutch; and means continuously driven by said prime-mover adapted to be connected with said branch transmission to cause a quick-traverse of said head.

15. A hobber combining a hob-spindle; a slidable head therefor; a work-spindle; a drive-system comprising a transmission extending from the one spindle to the other for establishing the rotational ratio therebetween; a prime-mover a master impositive clutch for connecting it with said drive-system; a branch transmission for sliding said head; a trip mechanism operated by slidable head for opening said master-clutch to discontinue the rotations of both of said spindles and to arrest the sliding of said head; a quick-traverse clutch; and means continuously driven by said prime-mover adapted to be connected through said quick-traverse clutch with said branch transmission to cause a quick-traverse of said head.

16. A hobber combining a hob-spindle; a slidable head therefor; a work-spindle; a drive-system comprising a transmission extending from the one spindle to the other for establishing the rotational ratio therebetween; a prime-mover; a frictional master clutch for connecting it with said drive-system; a branch transmission for sliding said head; a trip mechanism operated by slidable head for opening said master-clutch to stop the head and both spindles; a reversing clutch; and means continuously driven by said prime-mover adapted to be connected through said reversing clutch with said branch transmission alone to cause a quick-traverse in either direction of said head.

17. A hobber combining a hob-spindle; a slidable head therefor; a work-spindle; a drive-system comprising a transmission extending from the one spindle to the other for establishing the rotational ratio therebetween; a prime-mover; a frictional master clutch for connecting it with said drive-system; a branch transmission for sliding said head; a second clutch for positively relating said branch transmission to said drive-system to start or stop the feed of said head; a trip mechanism operated by slidable head for opening said master-clutch to stop automatically the drive-system and parts deriving motion therefrom; a reversing clutch; and means continuously driven by said prime-mover adapted to be connected through said third clutch with said branch transmission to cause a quick-traverse of said head.

18. A hobbing-machine combining a rotatable hob-spindle; a rotatable work-spindle; supports therefor including a feedable head for supporting the cutter and the work in a variable relation; a general transmission comprising a spindle rotating mechanism and a feed mechanism for positively actuating said parts simultaneously at tooling rates; a prime-mover; means to connect and disconnect said transmission with said prime-mover; quick-traverse mechanism for quickly varying the relation between the work and cutter; and a control system adapted to be manually and automatically operated, 1st manually to start the quick-traverse forwardly, 2nd automatically to stop it when the cutter is about to perform a tooling operation, 3rd manually to start the feed mechanism whenever the cutter is to perform a tooling operation, 4th automatically to disconnect said transmission to stop the rotation and feed when the cutter has performed its operation, 5th manually to start the quick-traverse reversely, and 6th automatically to arrest the return operation of the quick-traverse mechanism at a predetermined point.

19. A hobbing machine combining a rotatable hob-spindle; a rotatable work-spindle; supports therefor including a feedable head for supporting the cutter and the work in a variable relation; a main transmission for positively rotating simultaneously at tooling rates; a branch therefrom available for causing said head to feed; a prime-mover; means to connect and disconnect said main transmission with said prime-mover; an auxiliary quick-traverse mechanism available for quickly shifting said head; and a control system adapted to be manually and automatically operated, 1st manually to start the quick-traverse forwardly, 2nd automatically to stop it when the cutter is about to perform a tooling operation, 3rd manually to start the spindle rotating and feed mechanisms whenever the cutter is to perform a tooling operation, 4th automatically to disconnect said transmission to stop the rotation and feed when the cutter has performed its operation, 5th manually to accomplish a reverse quick-traverse while the spindles are non-rotating, and 6th automatically to arrest the return operation of the quick-traverse mechanism at a predetermined point.

In witness whereof, I have hereunto subscribed my name.

WILLIAM F. ZIMMERMANN.